(12) United States Patent
Wichmann et al.

(10) Patent No.: US 7,277,924 B1
(45) Date of Patent: *Oct. 2, 2007

(54) METHOD AND MECHANISM FOR A PORTAL WEBSITE ARCHITECTURE

(75) Inventors: Derek Wichmann, Redwood City, CA (US); Ling Lam, San Jose, CA (US); Chieng Guo, Foster City, CA (US); Michael Winton, San Francisco, CA (US)

(73) Assignee: Oracle International Corporation, Redwood Shores, CA (US)

(*) Notice: Subject to any disclaimer, the term of this patent is extended or adjusted under 35 U.S.C. 154(b) by 507 days.

This patent is subject to a terminal disclaimer.

(21) Appl. No.: 10/141,485

(22) Filed: May 7, 2002

(51) Int. Cl.
*G06F 15/16* (2006.01)

(52) U.S. Cl. .................. 709/217; 709/204; 709/219; 709/226; 709/229; 707/4; 706/61; 706/12; 706/14

(58) Field of Classification Search ............... 709/217, 709/219, 226, 229, 204; 707/74; 706/61, 706/14, 12
See application file for complete search history.

(56) References Cited

U.S. PATENT DOCUMENTS

| | | |
|---|---|---|
| 4,817,043 A | 3/1989 | Brown |
| 4,974,170 A | 11/1990 | Bouve et al. |
| 5,237,157 A | 8/1993 | Kaplan |
| 5,649,186 A | 7/1997 | Ferguson |
| 5,764,226 A | 6/1998 | Consolatti et al. |
| 5,765,142 A | 6/1998 | Allred et al. |
| 5,826,267 A | 10/1998 | McMillan |
| 5,875,242 A | 2/1999 | Glaser et al. |
| 5,897,649 A | 4/1999 | Kennedy |
| 5,983,227 A | 11/1999 | Nazem et al. |
| 5,991,735 A * | 11/1999 | Gerace .................... 705/10 |
| 6,014,137 A | 1/2000 | Burns |
| 6,029,182 A | 2/2000 | Nehab et al. |
| 6,144,991 A * | 11/2000 | England ................ 709/205 |
| 6,230,196 B1 | 5/2001 | Guenthner et al. |
| 6,275,833 B1 | 8/2001 | Nakamura et al. |
| 6,302,698 B1 | 10/2001 | Ziv-El |
| 6,327,628 B1 | 12/2001 | Anuff et al. |

(Continued)

OTHER PUBLICATIONS

Oracle Corporation "Oracle9iAS Portal Developer Kit (PDK)" http://portalstudio.oracle.com/pls/ops/docs/folder/community/pdk/articles/overview.portlets.html (Oct. 31, 2001) pp. 1-6.

(Continued)

*Primary Examiner*—Saleh Najjafi
*Assistant Examiner*—Liang-che Alex Wang
(74) *Attorney, Agent, or Firm*—Bingham McCutchen LLP (57) ABSTRACT

A method and mechanism for servicing a request for a web page from a user over a worldwide computer network using a portal management system. A user transmits a request for a web page with one or more portlets to a portal web server. The portal web server communicates with one or more web providers to obtain content for any portlets on the web page. Each web provider may communicate with one or more content retrievers, or access pre-rendered web pages generated by a performance engine, to retrieve content necessary to render the web page. Each content retriever may communicate with a content provider to obtain content. The portal web server assembles the requested web page using stored information and the appearance and operation of the web page and content supplied by the web provider.

26 Claims, 5 Drawing Sheets

U.S. PATENT DOCUMENTS

| | | | |
|---|---|---|---|
| 6,341,310 B1 | 1/2002 | Leshem et al. | |
| 6,424,979 B1 | 7/2002 | Livingston et al. | |
| 6,460,040 B1 | 10/2002 | Burns | |
| 6,587,668 B1 | 7/2003 | Miller et al. | |
| 6,643,661 B2 | 11/2003 | Polizzi et al. | |
| 6,684,369 B1 | 1/2004 | Bernardo et al. | |
| 6,701,314 B1* | 3/2004 | Conover et al. | 707/7 |
| 6,701,343 B1 | 3/2004 | Kenyon | |
| 6,760,916 B2* | 7/2004 | Holtz et al. | 725/34 |
| 6,766,362 B1 | 7/2004 | Miyasaka et al. | |
| 6,842,767 B1* | 1/2005 | Partovi et al. | 709/203 |
| 6,871,197 B1* | 3/2005 | Johnson | 706/61 |
| 6,871,216 B2* | 3/2005 | Miller et al. | 709/206 |
| 6,907,401 B1 | 6/2005 | Vittal et al. | |
| 6,928,610 B2 | 8/2005 | Brintzenhofe et al. | |
| 7,089,278 B1* | 8/2006 | Churchill et al. | 709/203 |
| 7,133,892 B2* | 11/2006 | Khan et al. | 709/203 |
| 2001/0025309 A1 | 9/2001 | Macleod Beck et al. | |
| 2001/0034609 A1 | 10/2001 | Dovolis | |
| 2001/0034771 A1* | 10/2001 | Hutsch et al. | 709/217 |
| 2001/0056398 A1 | 12/2001 | Scheirer | |
| 2002/0001649 A1 | 1/2002 | Lowry et al. | |
| 2002/0010709 A1 | 1/2002 | Culbert et al. | |
| 2002/0030741 A1 | 3/2002 | Broemmelsiek | |
| 2002/0036950 A1 | 3/2002 | Cosman et al. | |
| 2002/0049727 A1 | 4/2002 | Rothkopf | |
| 2002/0065802 A1 | 5/2002 | Uchiyama | |
| 2002/0069083 A1 | 6/2002 | Harter et al. | |
| 2002/0095312 A1* | 7/2002 | Wheat | 705/1 |
| 2002/0095368 A1 | 7/2002 | Tran | |
| 2002/0103777 A1 | 8/2002 | Zhang | |
| 2002/0103822 A1 | 8/2002 | Miller | |
| 2002/0112155 A1 | 8/2002 | Martherus et al. | |
| 2002/0123957 A1 | 9/2002 | Notarius et al. | |
| 2002/0133250 A1 | 9/2002 | Kopcha | |
| 2002/0152279 A1* | 10/2002 | Sollenberger et al. | 709/217 |
| 2002/0165960 A1 | 11/2002 | Chan | |
| 2002/0178031 A1 | 11/2002 | Sorensen et al. | |
| 2002/0194267 A1 | 12/2002 | Flesner et al. | |
| 2003/0009537 A1* | 1/2003 | Wang | 709/219 |
| 2003/0069940 A1* | 4/2003 | Kavacheri et al. | 709/217 |
| 2003/0074580 A1 | 4/2003 | Knouse et al. | |
| 2003/0084343 A1 | 5/2003 | Ramachandran et al. | |
| 2003/0113699 A1 | 6/2003 | Johnson et al. | |
| 2003/0115292 A1 | 6/2003 | Griffin et al. | |
| 2003/0126558 A1 | 7/2003 | Griffin | |
| 2003/0135393 A1 | 7/2003 | Burgess | |
| 2003/0140120 A1 | 7/2003 | Hartmann | |
| 2003/0145275 A1 | 7/2003 | Qian et al. | |
| 2003/0158508 A1 | 8/2003 | DiGianfilippo et al. | |
| 2003/0187998 A1* | 10/2003 | Petit | 709/229 |
| 2003/0191879 A1* | 10/2003 | Marmash | 710/113 |
| 2004/0015476 A1 | 1/2004 | Twaddle | |
| 2004/0044627 A1 | 3/2004 | Russell et al. | |
| 2004/0068477 A1 | 4/2004 | Gilmour et al. | |
| 2004/0205555 A1 | 10/2004 | Hind et al. | |
| 2004/0254860 A1 | 12/2004 | Wagner et al. | |
| 2004/0254881 A1 | 12/2004 | Kumar et al. | |
| 2005/0028081 A1 | 2/2005 | Arcuri et al. | |
| 2005/0044423 A1 | 2/2005 | Mellmer et al. | |
| 2005/0097180 A1 | 5/2005 | Abdelhak | |
| 2005/0256940 A1 | 11/2005 | Henderson et al. | |

OTHER PUBLICATIONS

Oracle Corporation "Oracle9iAS Portal, Feature Overview" http://portalstudio.oracle.com/pls/ops/docs/folder/community/otn_content/mainpage/keyfeatures_benefits/portal_FOV.html (May 2002) pp. 1-7.

Oracle Corporation "Oracle Application Server 10g, Oracle AS Portal" http://portalstudio.oracle.com/pls/ops/docs/folder/community/otn_content/mainpage/keyfeatures_benefits/portal_FOV_0.html (Sep. 2003) pp. 1-9.

Oracle Corporation "Oracle Application Server Portal Overview" (Sep. 2003) pp. 1-4.

Oracle Corporation "Creating and Managing Sites—Task Help" (Oct. 1999) pp. 111-197.

Oracle Corporation "Oracle8i™ Release 2 New Features Summary" (Nov. 1999) 17 pgs.

Oracle Corporation "Oracle Application Server Portal 10g (9.0.4) Product Overview, An Oracle White Paper" (Sep. 2003) pp. 1-9.

Oracle Corporation "Oracle9iAS Portal Release 2—Technical Overview; An Oracle White Paper" (Apr. 2002) pp. 1-30.

Oracle Corporation "Oracle9iAS Portal Release 2 (Version 9.0.2): New Features; An Oracle White Paper" (May 2002) pp. 1-34.

Guang, Y. et al. "Driving the Citizen-Oriented Information on the Electronic Highway" *Proceedings of the International Conference on Multimedia Computing and Systems*, Washington, D.C., USA (May 15-18, 1995), pp. 131-138.

Healy, P. "Wish You Were Here" *Which Computer?* (Aug. 1994) 17(8)40-41.

Holfelder, W. and D. Hehmann "Networked Multimedia Retrieval Management System for Distributed Kiosk Applications" *Proceedings of the International Conference on Multimedia Computing and Systems*, Boston, Massachusetts, USA (May 14-19, 1994) pp. 342-351.

Kearsley, G. and R.S. Heller, "Multimedia in Public Access Settings: Evaluation Issues" *J. Educational Multimedia and Hypermedia* (1995) 4(1):3-24.

Maloney, J.H. and R.B. Smith "Directness and Liveness in the Morphic User Interface Construction Environment" *Proceedings of the 1995 8th Annual Symposium on User Interface Software and Technology (UIST '95)*, Pittsburgh, Pennsylvania, USA (Nov. 14-17, 1995) pp. 21-28.

Martinez, C.D. "All That Jazz" *Presentations* (Jun. 1994) pp. 44-50.

Steiger, P. and B.A. Suter "MINNELLI—Experiences with an Interactive Information Kiosk for Casual Users" *Computer Science Research at UBILAB—Stragegy and Projects*, W.R. Bischofberger, H.-P. Frei (eds.), *Proceedings of the UBILAB Conference '94*, Zurich, Switzlerand (1994) pp. 124-133.

\* cited by examiner

METHOD AND MECHANISM FOR A PORTAL WEBSITE ARCHITECTURE

COPYRIGHT NOTICE

A portion of the disclosure of this patent document contains material which is subject to copyright protection. The copyright owner has no objection to the facsimile reproduction by any one of the patent disclosure, as it appears in the Patent and Trademark Office patent files or records, but otherwise reserves all copyright rights whatsoever.

FIELD OF THE INVENTION

The invention generally relates to the field of portal websites.

BACKGROUND AND SUMMARY OF THE INVENTION

Generally, a web site is an arrangement of content, e.g., text, images, and sound, on a set of web pages configured for presentation over a computer network in a predetermined way. The content appearing on a web page is generally stored in a centralized location, such as, e.g., a database or a set of files, that is local to a web server. Requests for web pages, which are typically transmitted by web browsers via the HTTP protocol, are processed by the web server. Centralizing the storage of the content found on web pages facilitates its transmission by the web server because the web content is in a known location that is readily available.

Web sites have become more complex as their application has spread. Web sites have proven to be a valuable means of communication both with the public (e.g., a corporate web site) and in private use (i.e., an Intranet site). In either case, it is advantageous to display content with as much breadth and depth as possible to maximize the utility of the web site to its users. However, as web content becomes more complex and diverse, the amount of time, money, and effort in obtaining, storing, and updating the web content has increased.

More recently, portal web sites have been used to deliver complex and diverse content over a computer network. A portal web site is a web site containing at least one web page with one or more portlets displayed thereon. A portlet is a configurable content area displayable on a web page that displays content obtained from a source remotely to the web server, or performs one or more functions remotely to the web server. For example, a portal web site may use an arrangement of portlets to display web content on different subject areas. The web content for each of the subject areas need not be stored centrally to the web server, but rather the content for each subject area may be stored in a plurality of locations geographically removed, but each accessible to the web server. A portlet may be configured such that it may display customized information to a user.

An existing problem with this approach is that developing portal web sites still requires a significant investment of time, money, and effort. This is due, in part, to the cost of supporting the hardware and software necessary to support a portal web site and the computer specialists required in managing portal web sites. Further, constructing a portal web site from scratch is a time and labor intensive process. These associated costs often prohibit those without significant resources from building or using a portal web site. Additional complexities inherent in obtaining content from third parties and administrating a portal web site add to the prohibitive associated costs. For example, it is desirable to present content on a portal web site that is both diverse in subject and current in its timeliness. However, it requires significant financial and computer resources to make available such content using conventional mechanisms.

Accordingly, the present invention provides an improved method for servicing a request for a web page from a user over a worldwide computer network. In an embodiment, the method includes receiving a first request for a web page from a user at a portal web server, wherein the web page being requested comprises content that does not reside at the portal web server. Next, transmitting one or more second requests to one or more web providers, each second request being for data necessary to render the web page, wherein each web provider only receives second requests for data in which the web provider supports. Thereafter, fulfilling each second request, wherein each fulfilled second request results in a set of resultant content. Next, assembling all sets of resultant content at the portal web server into a web page, the portal web server comprising information about the appearance and operation of the web page. Subsequently, the web page may be transmitted to the user. Further details of aspects, objects, and advantages of the invention are described below in the detailed description, drawings, and claims.

BRIEF DESCRIPTION OF DRAWINGS(S)

The present invention is illustrated by way of example, and not by way of limitation, in the figures of the accompanying drawings and in which like reference numerals refer to similar elements and in which.

DETAILED DESCRIPTION OF EMBODIMENT(S)

In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

A user, as used within, refers to any person or computing entity that receives or consumes content from the portal management system 100. In other words, a user may be a human being or a computer program. A group, as used herein, is a set of users who may be collectively assigned certain access permissions to portions of a portal web site. An administrator, as used herein, refers to any person that manages the operation of the portal management system 100. Content, as used herein, refers to any information displayable on a web page, such as text, images, or sound files.

I. Functional Overview

Figure 1:
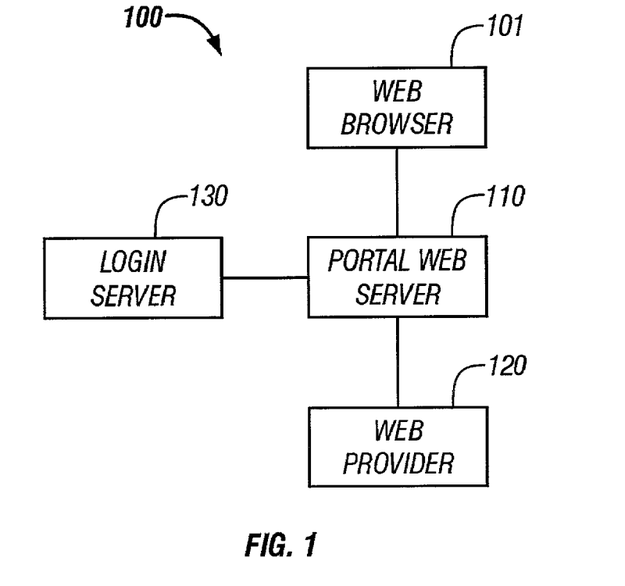
FIG. 1 is a pictorial representation illustrating the functional components of a portal management system 100 according to an embodiment of the invention.

FIG. 1 is a pictorial representation illustrating the functional components of a portal management system 100 according to an embodiment of the invention. According to an embodiment of the invention, the portal management system 100 allows a user to manage portal web sites and the content appearing thereon. The portal management system 100 includes a web browser 101, a portal web server 110, and a web provider 120. In embodiments of the invention, the portal management system 100 may also include a login server 130.

A web browser 101 is any device capable of browsing content over a worldwide computer network, such as the Internet, and is operatively connected to the portal web server 110. While only one web browser 101 is shown in FIG. 1, multiple web browsers 101 may be operatively connected to the portal web server 110. The web browser 101 and the portal web server 110 may communicate over a worldwide computer network using well-known communication protocols, such as TCP/IP, HTTP, and XML. A portal web server 110 is any web server that serves content pertaining to a portal web site to one or more web browsers 101. In an embodiment, a portal web server 110 is implemented using the 9iApplication Server available from Oracle Corporation, located in Redwood Shores, Calif. A portal web site is a web site containing one or more portlets displayed on a web page thereon. A portlet is a configurable content area displayable on a web page that displays content obtained from a source remotely to the web server, or performs one or more functions remotely to the web server. A portlet may be configured such that it may display customized information to a user.

A web provider 120 is a functional component that provides content for a portlet in response to requests from the portal web server 110. A web provider 120 may, although it need not, be embodiment in software operating on a separate hardware device other than that executing the portal web server 110. In some embodiments, the web provider 120 may be implemented using a cross-platform component architecture, e.g., the JavaBean™ architecture from Sun Microsystems, Inc., located in Palo Alto, Calif. Such an embodiment is advantageous when deploying web providers 120 over multiple platforms.

A login server 130 is a standard software component which verifies and authorizes the identities of users. A user accessing the portal management system 100 may need to obtain authorization from the login server 130 prior to substantial use of the portal management system 100. In an embodiment, the user may obtain authorization from the login server 130 by transmitting information related to their identity to the portal web server 110, which is subsequently transmitted to the login server 130 for verification. Once a user is authenticated by the login server 130, a user identifier, which is information that uniquely identifies the user, may be assigned by the login server 130. The user identifier may accompany all transmissions from the user. As the identity of the user may be ascertained from his transmissions by his user identifier, the state of the portal management system 100 for that user may be preserved. For example, in an embodiment, as the state of the portal management system 100 is preserved for each user, a home page or default configuration for a user may, by default, be initially displayed by the portal web server 110. In an embodiment, the login server 130 may be implemented using the Single Sign-on Server, available from Oracle Corporation, located in Redwood Shores, Calif.

In embodiments of the invention, the portal web server 110, web provider 120, and the login server 130 may each be operatively connected to one or more databases (not shown in FIG. 1) to enable the portal web server 110, web provider 120, and the login server 130 to store, manage, and retrieve data. A database is a standard software component for storing, managing, and retrieving data, and includes the plurality of databases known to those in the art, such as, e.g., the Oracle 8i database, available from Oracle Corporation, located in Redwood Shores, Calif. While those skilled in the art recognize that data stored in a single database may be stored across multiple database, and vice-versa, for ease of explanation the present invention shall be described such that the portal web server 110, web provider 120, and login server 130 are operatively connected to individual databases. However, the present invention is not limited to any particular arrangement of databases. Embodiments of the invention include the use of backup or failover databases or disc arrangements, such as in a RAID arrangement, to promote uninterrupted operability of the database.

In embodiments of the invention, the database stores information about groups of related users in different database schemas. In other embodiments, the database stores information about related groups of users using the same database schema. Access is restricted in the database schema such that users may only access information pertinent to their associated group. In some embodiments, this is performed using a virtual private database ("VPD"), which is a feature of the Oracle 8i database available from Oracle Corporation, located in Redwood Shores, Calif. This feature is described in patent application Ser. No. 09/167,092, filed on Oct. 5, 1998, and in patent application Ser. No. 09/812,896, filed on May 31, 2001, each of which are assigned to the assignee of the present application and each are hereby incorporated herein by reference. Other embodiments of the invention may perform the function of restricting access to rows in a database table by user through a variety of other methods, such as, e.g., using a database view or the use of a session table. In order to prevent unnecessarily obscuring the description of the present invention, embodiments of the invention shall store information about multiple users of the portal management system 100 in the same schema in the database, but will restrict access such that a user may only access information stored in the database authorized to that user. Embodiments of the invention may use any of the aforementioned mechanisms to restrict access on the database schema by, for example, associating a subscriber identifier with each user. A subscriber identifier is a unique identifier for a set of users. For example, a company may be assigned the same subscriber identifier. All users of the company in the example may have a different user identifier, but may have the same subscriber identifier. By associating a subscriber identifier with each user, access to a database may be restricted using the techniques discussed above.

For the sake of clarity and brevity, only one portal web server 110, web provider 120, and login server 130 are depicted. Those skilled in the art shall recognize that for a variety of reasons, including scalability and performance, multiple portal web servers 110, web providers 120, and login servers 130 may be used. Accordingly, the invention is not limited to any particular number or arrangement of functional components, such as portal web servers 110, web providers 120, and login servers 130 within the portal management system 110.

Figure 2:
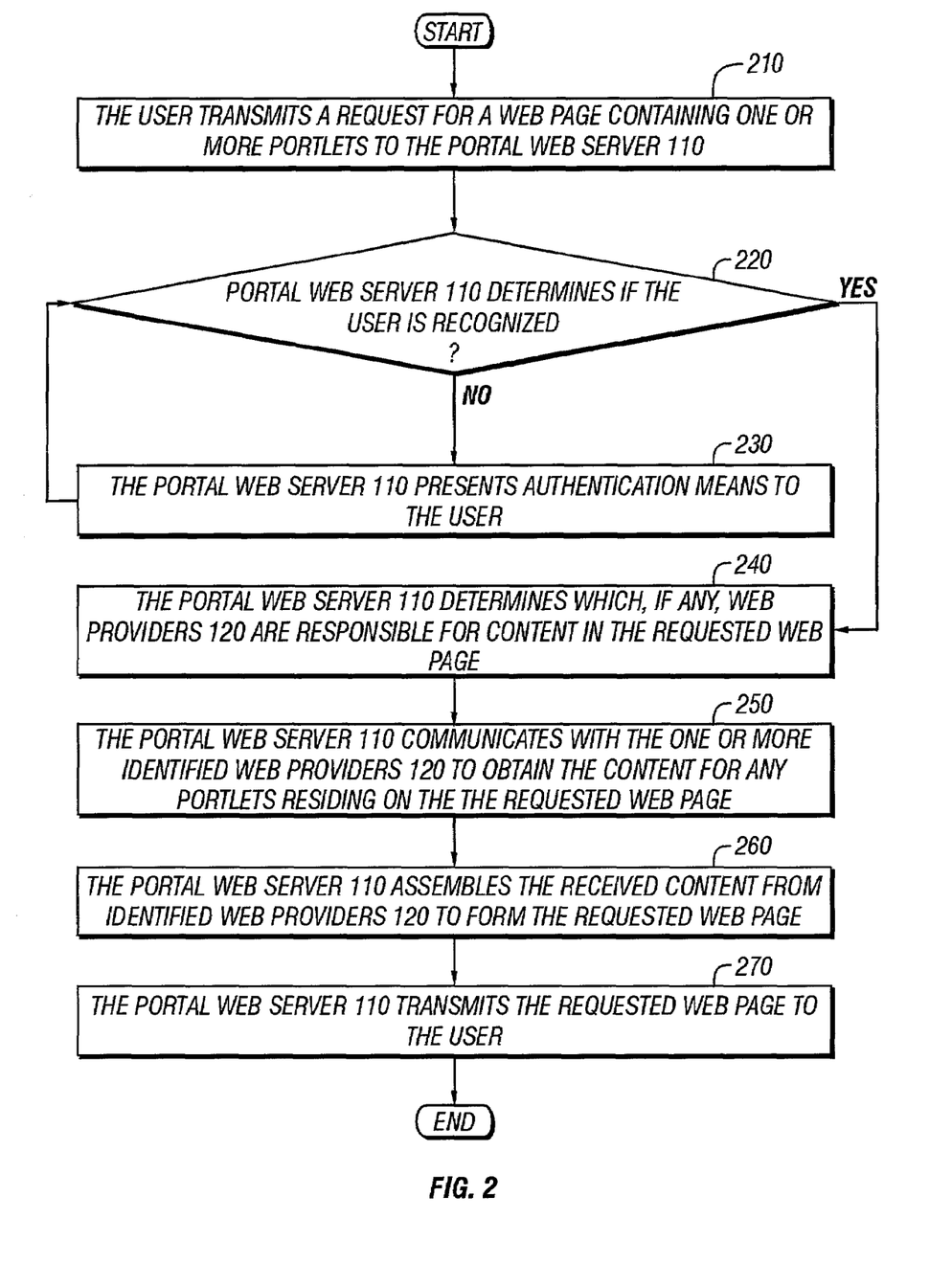
FIG. 2 is a flow chart illustrating the steps in the operational flow of requesting content through the portal management system 100 according to an embodiment of the invention.

The operational flow of requesting content through the portal management system 100 will be presented with reference to FIG. 2, which is a flow chart illustrating the same according to an embodiment of the invention. In an embodiment, initially, in step 210, the user transmits a request for a web page containing one or more portlets to the portal web server 110. The request may be sent by the user through a web browser 101 associated with the user. Subsequently, the portal web server 110 determines in step 220 if the user is recognized (i.e., "logged in"). This may be accomplished by examining an associated user identifier accompanying the user request. If the user is not recognized by the portal web server 110, then the portal web server 110 may provide authentication means to the user so that the user may authenticate him or herself in step 230. Such means may include a web page where the user may submit information regarding their identity, such as a username and password. Subsequently, the identifying information may be transmitted by the portal web server 110 to the login server 130 for verification. The login server 130 may, upon receiving the identifying information, verify the user's identity with information stored about the user in a database associated with the login server 130. Thereafter, the login server 130 may transmit the results of the verification to the portal web server 110. In embodiments, the user may be given a predetermined number of opportunities to authenticate him or herself before the portal management system 100 disables the user's account within the portal management system 100. If the user is recognized by the portal web server 110, then operation proceeds to step 240.

In an embodiment, in step 240, the portal web server 110 determines which, if any, web providers 120 are responsible for content in the requested web page. For example, if a requested web page has two portlets displayed on it, each web provider 120 that supports one of the two portlets on that requested web page may be identified. In an embodiment, after determining which web providers 120 are responsible for content, the portal web server 110 communicates with the one or more identified web providers 120 to obtain content for any portlets residing on the requested web page in step 250. Upon receiving the request, the web providers 120 parse the request, fulfil the request, and transmit the information satisfying the request to the portal web server 110. For example, a web provider 120 may provide functionality regarding formula management. If a request is received by that web provider 120 to retrieve a particular formula, then the web provider fulfils the request by retrieving the requested formula, and transmitting the formula to the portal web server 110. This example is described in further detail in United States patent application Ser. No. 10/071,260, filed on Feb. 7, 2002, assigned to Oracle Corporation of Redwood Shores, Calif., which is incorporated herein by reference.

In an embodiment, subsequently, the portal web server 110 assembles the received content from the identified web providers 120 to form the requested web page 260. As discussed in further detailed below, the portal web server 110 assembles the content to form the requested web page by merging data received from web providers 120 and data stored in an associated central repository concerning the organization and presentation of the web page. Thereafter, in an embodiment, the portal web server 110 transmits the requested web page to the user in step 270. The user typically receives and renders the requested web page in an associated web browser 101. The process depicted in FIG. 2 may be repeated if the user requests an additional web page. In an embodiment, the portal web server 110 may periodically transmit updated information about a particular portlet to a web browser 101 without receiving an explicit user request to do so, if the portal web server 110 previously transmitted information to the web browser 101 about that portlet, and the portal web server 110 received notification that a more current set of information for that portlet is available. For example, if a user loaded a world news portlet in their web browser 101, the world news displayed in the portlet may be updated by the portal web server 110 when notification is received by the portal web server 110 that updated information becomes available. Such notification regarding the relative freshness of the data may be stored in the portal web server 110, or may be received periodically from the web provider 120.

II. Assembling Content at Portal Web Server

In an embodiment, the portal web server 110 stores information regarding the composition of a web page with one or more portlets displayed thereon in a central repository, such as a database. Aspects of the invention directed towards storing information in a central repository are detailed in U.S. patent application Ser. No. 09/540,092, filed on Mar. 31, 2000, U.S. patent application Ser. No. 09/540,977, filed on Mar. 31, 2000, both of which are assigned to the assignee of the present invention and both of which are incorporated herein by reference.

The portal web server 110 assembles the requested web page using any content received from web providers 120 and data stored in an associated central repository concerning the organization and presentation of the web page. In an embodiment, the data stored in the central repository that the portal web server 110 uses in assembling the requested web page includes data concerning the following attributes of the web page: style, layout, content resident thereon, portlets displayed thereon, items displayed thereon, groups, folders, and user permissions for the web page. In other words, the portal web server 110 manages data concerning the appearance and operation of portal web sites in a central repository, such as a database, and uses that information to assemble the web page, along with content received from web providers 120. The data the portal web server 110 uses in rendering web pages may be directed towards visual aspects of the page, e.g., style or layout information, or it may be directed towards operational aspects of the page, e.g., what portlets are displayed, permissions regarding access to portions of the web page. Accordingly, in an embodiment, the portal web server 110 manages user permissions regarding the content displayed on the portal web site. Said differently, users may be assigned permission levels to restrict their access to content at multiple levels of granularity, e.g., web pages, folders, portlets, and individual items on a web page.

III. Obtaining Content from Content Providers

Figure 3:
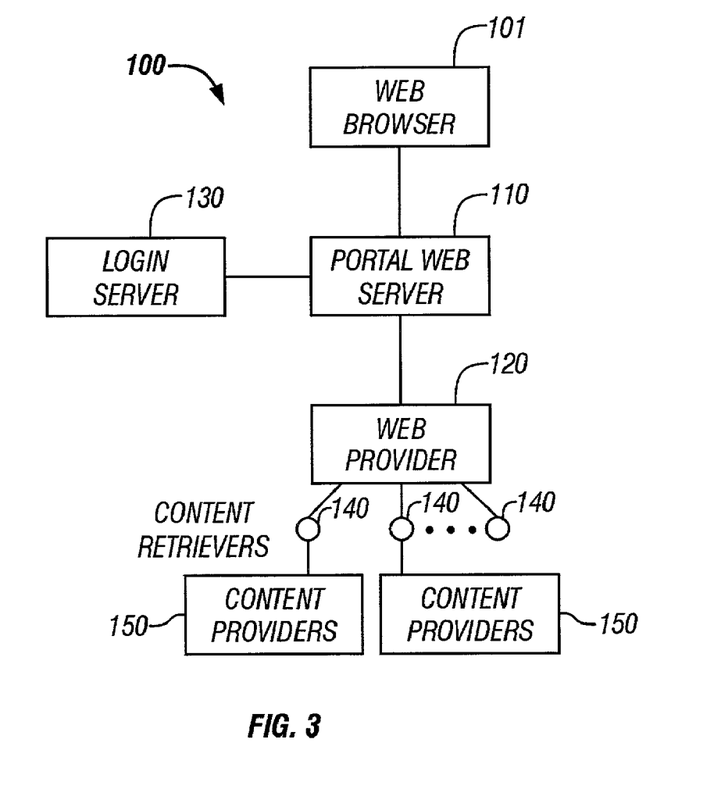
FIG. 3 is a pictorial representation illustrating the functional components of a portal management system 100 incorporating content from content providers according to an embodiment of the invention.

FIG. 3 is a pictorial representation illustrating the functional components of a portal management system 100 incorporating content from content providers 150 according to an embodiment of the invention. FIG. 3 includes components discussed above with reference to FIG. 1, as well as content retrievers 140 and a content provider 150. A content retriever 140 is a software component that is responsible for obtaining content from a content provider 150, translating the content in an understandable form to the web provider 120, and delivering the content to the web provider 120. In an embodiment, a content retriever 140 may be constructed using JSP (Java Server Page) technology available from Sun Microsystems, located in Mountain View, Calif. A content provider 150 is any computerized source or provider of content, such as, e.g., a news agency, a magazine, or an organization. For example, a news agency such as Knight Ridder may be a content provider 150, since Knight Ridder is a communications company engaging in the distribution of news over electronic channels.

Figure 4:
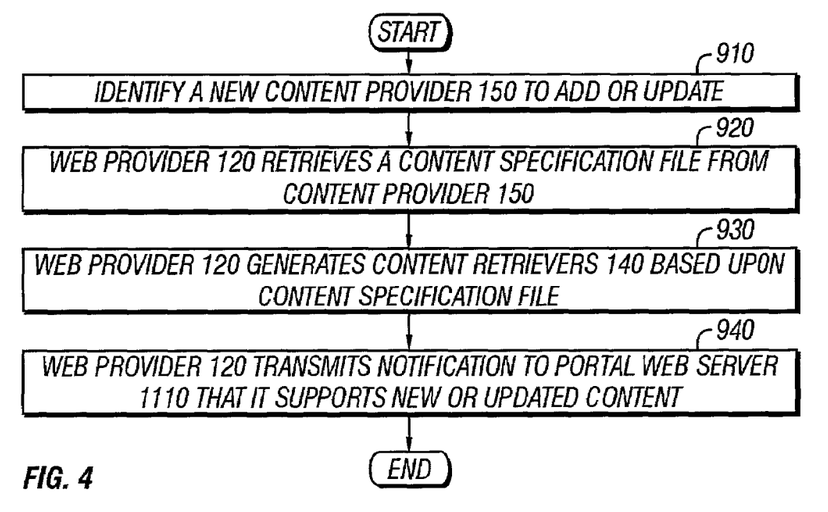
FIG. 4 is a flow chart illustrating the operational flow of adding a new content provider 150 or updating the capabilities of an existing content provider 150 in the portal management system 100 according to an embodiment of the invention.

The operational flow of adding a new content provider 150 or updating the capabilities of an existing content provider 150 in the portal management system 100 shall now be described with reference to FIG. 4, which is a flow chart illustrating the same according to an embodiment of the invention. According to an embodiment, the first step 910 is to identify a new content provider 150 to add or update in the portal management system 100. In other words, in addition to identifying a new content provider 150, a content provider 150 currently existing within the portal management system 100 may be identified so that the content and features that content provider 150 supports may be updated within the portal management system 100.

After a content provider 150 is identified, a web provider 120 retrieves a content specification file from the identified content provider 150 in the next step 920 according to an embodiment. The content specification file is a file that contains a description in a specific format of the content that the content provider 150 supports and information describing how to connect to the content stored at the content provider 150. The content specification file may be obtained by the web provider 120 by a variety of electronic means, including, e.g., a ftp connection or a HTTP request. The content supported by a content provider 150 may by grouped into content modules, which are logical organizations of related content. For example, one content module may be directed towards the daily sports scores, while another content module may be directed towards world news. In an embodiment, the content specification file may contain information about all the content modules supported by the content provider 150. Such information may include information about how to categorize the content module, details on how to connect to the content module, any parameters supported by the content module allowing customization, and information about how often the information in the content module is updated by the content provider 150.

In an embodiment, the next step 930 is for the web provider 120 to generate content retrievers 140 based upon the retrieved content specification file. In an embodiment, just prior to step 930, if the web provider has any existing content retrievers 140 associated with the content provider 150 being added or updated, then those existing content retrievers 140 are deleted in anticipation of step 930. The content retrievers 140 are generated based upon the information contained within the content specification file. In an embodiment, one content retriever 140 is generated for each content module specified within the content specification file. As the content specification file contains information on how to connect to the content modules, the content retriever 140 may be generated such that they may connect to content modules supported by the content provider 150. The content retrievers 140 are generated such that they may transmit information to the web provider 120 generating them in a manner understandable to the web provider 120.

Subsequently, in an embodiment, the portal web server 110 makes a request to the web provider 120 to determine if the web provider supports new or updated content 940. In response, the web provider 120 transmitted notification to the portal web server 110 indicating the content that the web provider supports. The transmitted notification contains a description of all the new content supported by the web provider 120, includes any new content modules. Thereafter, the portal web server may provide users the ability to view and access the newly added content, e.g., by adding a new portlet to their web site.

The retrieval of content by a user from a content provider 150 is facilitated by a content provider user identifier, or CPUI, which uniquely identifies each user to a particular content provider 150. Initially, in an embodiment, a CPUI is generated and maintained by each web provider 120 for each user based upon user information supplied by the portal web server 110. In certain embodiments, the CPUI may be generated by the web provider 120 automatically, e.g., concatenating the username of the user with a randomly generated string. A user may have a CPUI for each content provider 150 from which he or she receives content. A user does not need to know the value of his associated CPUIs, as it is used internally by the portal web server 110 when serving content from content providers 150 to users. The CPUI may be stored in a variety of locations, e.g., in an embodiment, a CPUI may be stored in a cookie at a web browser 101 associated with a user. In another embodiment, the CPUI may be stored at the web provider 120.

The operational flow of obtaining content from a content provider 150 shall now be discussed with reference to FIG. 5, which is a flow chart illustrating the functional steps of obtaining content from a content provider 150 according to an embodiment of the invention. In an embodiment, initially in step 1010, a user makes a request for content from a web browser 101. For example, a user may request a web page that displays multiple portlets from their web browser 101. Subsequently, the user request is received by the portal web server 110 in the embodiment illustrated in step 1020. Thereafter, in step 1030, the portal web server 110 identifies any web providers 120 that provide content requested by the user according to an embodiment. For example, if a requested web page contains two portlets, one displaying fishing content and the other displaying regional news, then the web providers 120 supporting the fishing and regional news portlets are identified by the portal web server 110. In an embodiment, web providers 110 maintain a CPUI for each content provider 150 associated with each user. The portal web server 110 may not, in some embodiments, have any knowledge of the CPUI. In such an embodiment, the CPUI is generated, maintained, and retrieved for a specific user based upon an identifier sent from the portal web server 110, e.g., username, company id, etc., to the web provider 120.

Next, in an embodiment, the portal web server 110 transmits a request for data to any web provider 120 responsible for content present in the user request 1040. The request for data is directed towards obtaining that portion of the user's original request that is supported by the web provider 120. To illustrate, in the example above, only a request for fishing data will be sent to the web provider responsible for fishing information. Note that in certain embodiments the web provider 120 may be able to provide the content for the user request without contacting a content retriever 140. Such an embodiment may be used when the web provider 120 does not obtain content from a content provider 150, but is itself responsible for retrieving and supplying content.

Thereafter, in an embodiment, the web provider 120 communicates the request for data to those content retrievers 140 required in satisfying the request 1050. For example, if the request for data concerns world news, then only the content retriever 140 responsible for retrieving world news data from the content provider 150 may needed to service the request. In an embodiment, the CPUI is also transmitted with the communicated request.

Next, in step 1060, the content retrievers 140 contacted in step 1050 retrieve data from the content providers 150 according to an embodiment. In an embodiment, the CPUI may be used to retrieve data from the content provider 150 to satisfy the user request. In other words, content retrievers may retrieve content from a content provider 150 that is customized for the user based upon the CPUI associated with the content provider 150 for that user. Note that the content retriever 150 need not retrieve customized content for each user every time, e.g., there may be no customized content available, or a CPUI may not be established. In such a case, content would still be retrieved from the content provider 150, but it would not be customized for the user.

Finally, in step 1070, the data is returned to the portal web server 110, assembled, and delivered to the requesting web browser 101 according to an embodiment. The content retrievers 140 transmit the retrieved data from the content providers 150 to the portal web server 110 via the web providers 120. The portal web server 110 assembles the content of the request web page, and transmits the assembled web page to the requesting user.

Figure 5:
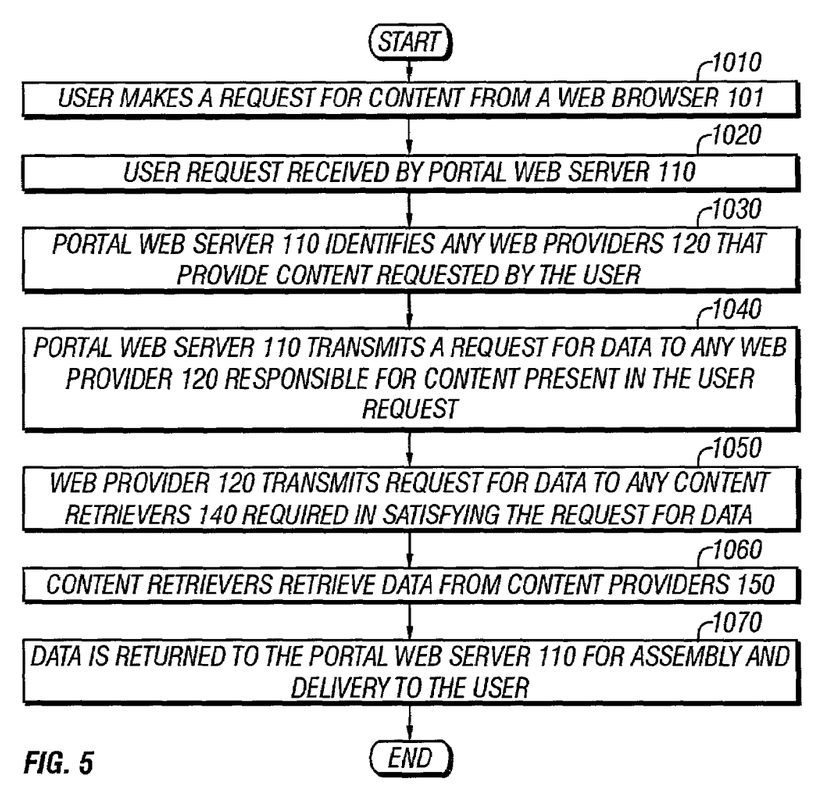
FIG. 5 is a flow chart illustrating the functional steps of obtaining content from a content provider 150 according to an embodiment of the invention.

The description of FIG. 5 may be employed when users request content for portlets they may have customized. As the CPUI uniquely identifies the user, and the CPUI is transmitted to the content provider 150 with the request for data, the content provider 150 may tailor the content request to the individual requesting user. A user may store content customizations or preferences with any content provider 150 with their CPUI, allowing subsequent content requests from that user to be answered in view of their customizations or preferences. In an embodiment, content providers 150 allows the user to store customizations and preferences which may be used when supplying content to that user by providing means to display a web page to the user which may be used to record customizations and preferences. These customizations and preferences may be stored and maintained by the content provider 150. The web browser 101 of the user may be identified to the content provider 150, e.g., through a cookie associated with the user by the portal web server 110 or showing a web page associated with the content provider 150 the first time the portal web server 110 displays content form the content provider 150.

For the sake of clarity and brevity, only three content retrievers 140 and two content providers 150 are depicted in FIG. 3. As it would be advantageous to support a diverse selection of available content through the portal management system 100, many content retrievers 140 connecting to many content providers 150 may be employed using the teachings herein. Accordingly, the invention is not limited to any particular number or arrangement of content retrievers 140 and/or content providers 150.

IV. Performance Engine

Figure 7:
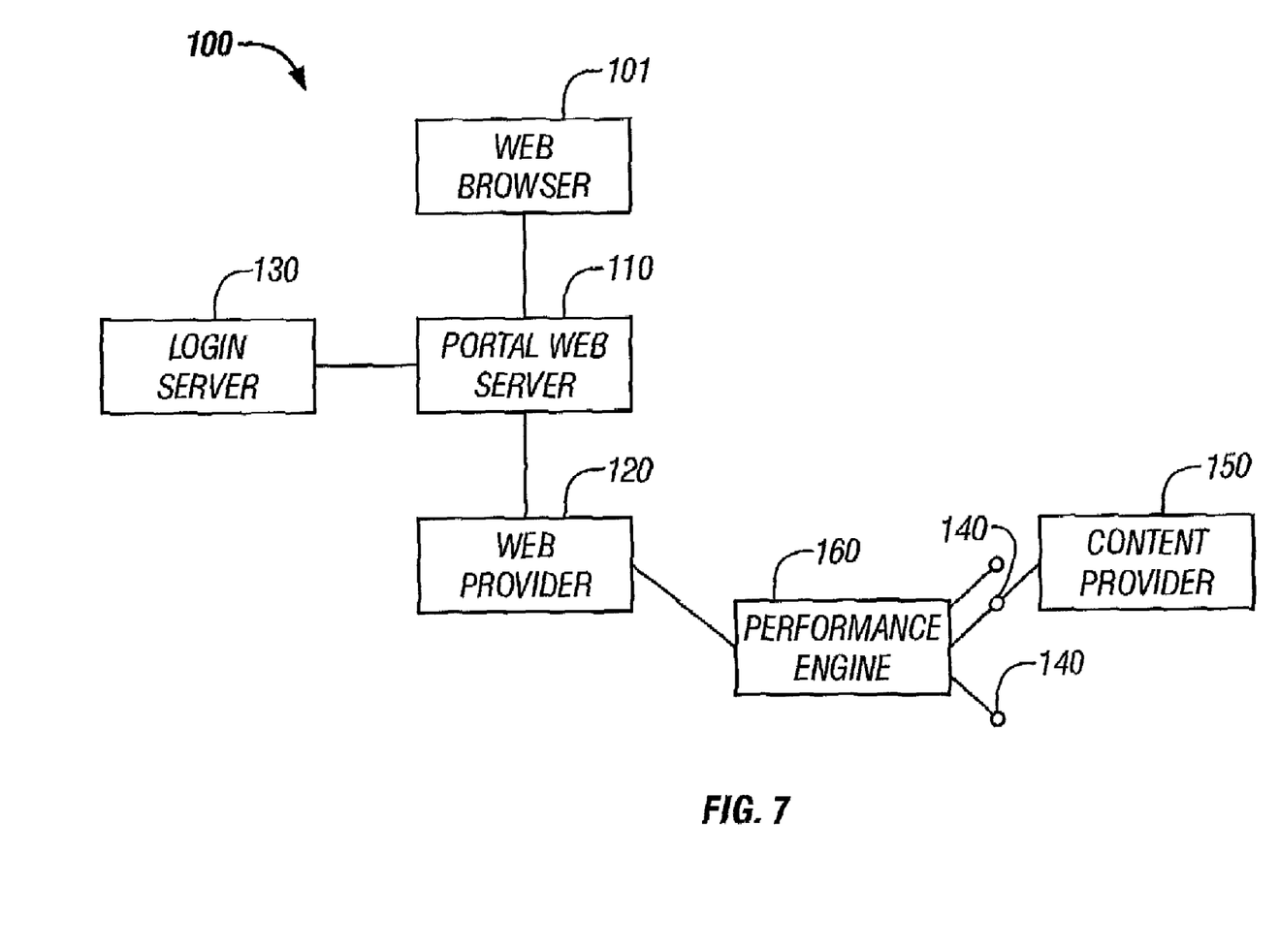
FIG. 7 is a pictorial representation illustrating the functional components of a portal management system 100 comprising a performance engine according to an embodiment of the invention.

In embodiments of the invention, the portal management system 100 includes a performance engine 160. A performance engine 160 is a functional component that pre-generates content for one or more portlets prior to the user transmitting a request to the portal web server 110 for the same. Employment of a performance engine 160 is advantageous because it allows the portal web server 110 to respond more quickly to user requests for web pages containing one or more portlets.

FIG. 7 is a pictorial representation illustrating the functional components of a portal management system 100 comprising a performance engine 160 according to an embodiment of the invention. As FIG. 7 shows, the performance engine 160 may be coupled to one or more content retrievers 140, allowing the performance engine 160 to obtain content from one or more corresponding content providers 150. After the performance engine 160 collects data from the content provider 150, the performance engine 160 may render the content for each portlet supported by the content provider 150 using the collected data. In other words, the graphical display that each portlet displays may be rendered by the performance engine 160 prior to a request for the same, using the collected data from the content retrievers 140. Subsequently, the pre-generated content for each portlet may be stored in a central repository, such as a file system or a database, which is accessible to the web provider 120. Thereafter, when a web provider 120 receives a request from the portal web server 110 for data to render a portlet for a user, the web provider 120 may check the central repository to determine if any pre-rendered content exists for the requested portlet for the user. In an embodiment, the pre-rendered content for each portlet may be associated with a time stamp to ensure the content is fresh, i.e., the pre-rendered content may only be used for the duration of the time stamp.

In an embodiment of the invention, the content the performance engine 160 pre-generates for a particular portlet is the same for all users, i.e., without regard to any customizations the user may have with the particular portlet. The performance engine 160 may obtain content from a content provider 150 and pre-generate the display of portlets periodically using pre-configured time intervals.

In another embodiment, the performance engine 160 may customize the pre-generated content of one or more portlets for one or more users. The performance engine 160 may use a CPUI to collect data for a particular user for a particular portlet from one or more content retrievers 140. In such an embodiment, the web provider 120 or the portal web server 110 may provide the performance engine 160 with access to a list of CPUIs. When a web provider 120 receives a request for data to render a portlet for a user, the web provider 120 may check the central repository for any pre-rendered content for the portlet for the user. In an embodiment, the web provider 120 may also check to ensure that any pre-rendered content is fresh, i.e., any associated time-stamps with the pre-rendered content have not expired. If pre-rendered content exists for the particular portlet for the user, it may be transmitted to the portal web server 110. If pre-rendered content does not exist for the user for the particular portlet, then the web provider 120 may transmit a request to the performance engine 160 to pre-render content for that user and particular portlet.

In an embodiment, the web provider 120 may send a time stamp to the performance engine 160 each time a user visits a particular portlet to allow the performance engine 160 to monitor the last visit of each user to a particular portlet. In an embodiment, the performance engine 160 may pre-generate content for all portlets for all users that have visited one or more portlets within a specified time. In another embodiment, the performance engine 160 may pre-generate content only for portlets that users have recently visited, i.e., within a pre-configured specified time interval. After the length of time since a user's last visited a particular portlet has elapsed a pre-configured specified time interval, the performance engine 160 may discontinue pre-rendering content for that user for the particular portlet. In other embodiments, the content may be pre-generated at intervals corresponding to whether the user is currently active, recently active, or inactive. For example, a currently active user, i.e., a user who accessed content within a relatively small time interval, e.g., one hour, may have content pre-generated by the performance engine 160 often, e.g., every five minutes. A user who is recently active, i.e., a user who is not active, but has accessed content within a relatively larger time interval, e.g., one week, may have content pre-generated by the performance engine 160 regularly, e.g., once per day. A user who is not active, i.e., has not accessed content within a relatively long time, e.g., longer than a week, may not have any content pre-generated for him or her. Accordingly, the user may have content pre-generated for him or her on multiple levels of granularity based upon the last time of content access.

In an embodiment, the performance engine 160 may perform automatic error handling if the content retriever 140 cannot provide valid data (or may be completely unavailable) within a configurable multiple of the periodicity which a particular piece of content normally updates. For example, if the performance engine 160 pre-generates content from a news content retriever 140 once per hour, we may choose to flag an error if content is unavailable from a content retriever 140 for 3×1 hour=3 hours. In this case, instead of showing stale content in the portlet, a message may be shown such as "We apologize for the inconvenience—we are having technical problems obtaining content from the news source." Additionally, email notifications to an operations team associated with the relevant content provider 150 could automatically be triggered, and an error-reporting portlet may be utilized to summarize the content retrievers 140 currently having problems. Once the problem is resolved with the content retriever 140, the performance engine may then automatically replace the "unavailable" message with content obtained from the content retriever 140.

V. Deployment Considerations

The execution of the sequences of instructions required to practice the invention may be performed in embodiments of the invention by a computer system 1100. In an embodiment of the invention, execution of the sequences of instructions required to practice the invention is performed by a single computer system 1100. According to other embodiments of the invention, two or more computer systems 1100 coupled by a communication link 1115 may perform the sequence of instructions required to practice the invention in coordination with one another. In order to avoid needlessly obscuring the invention, a description of only one computer system 1100 will be presented below; however, it should be understood that any number of computer systems 1100 may be employed to practice the invention.

Figure 6:
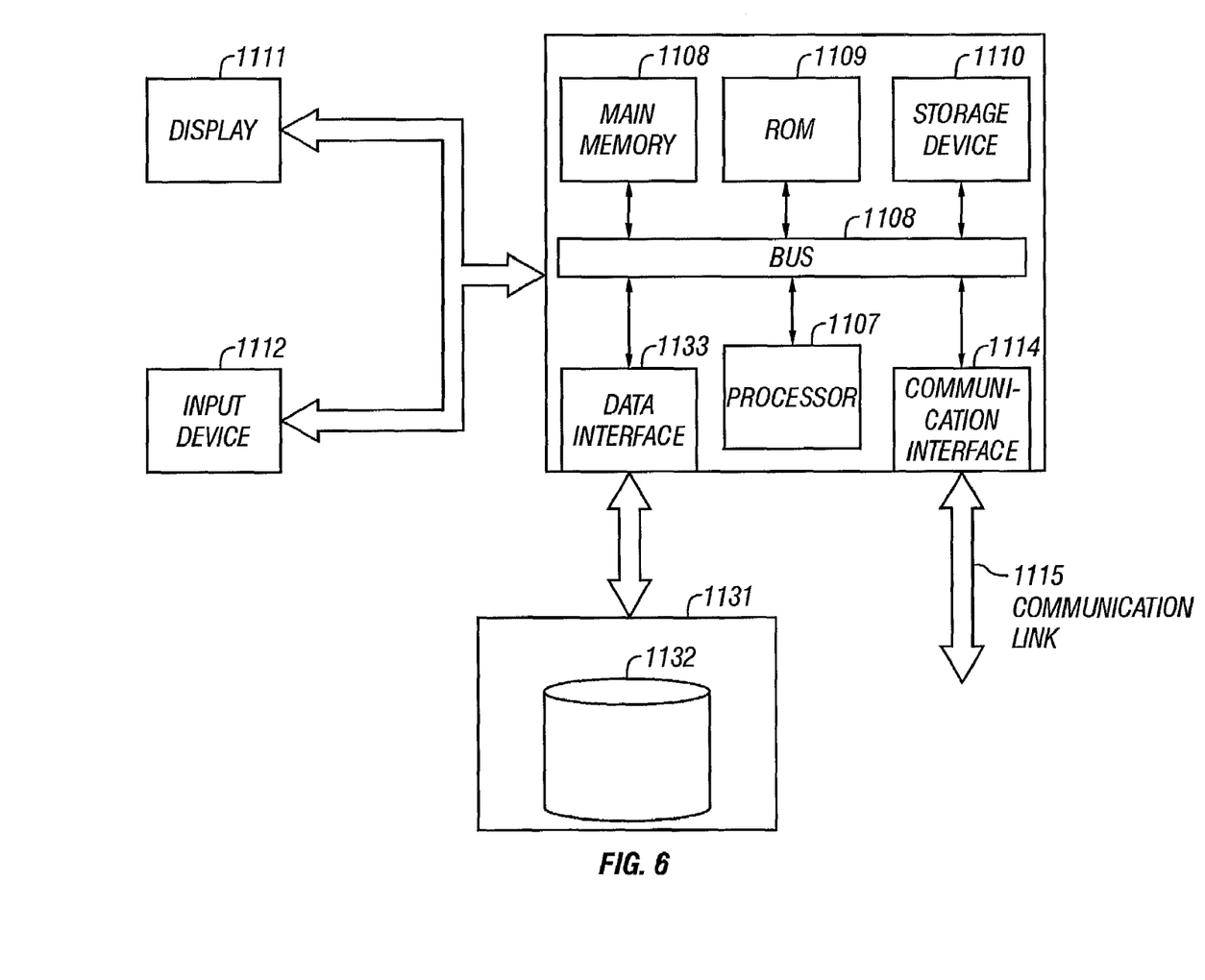
FIG. 6 is a block diagram of the functional components of a computer system 1100 according to an embodiment of the invention.

A computer system 1100 according to an embodiment of the invention will now be described with reference to FIG. 6, which is a block diagram of the functional components of a computer system 1100 according to an embodiment of the invention. As used herein, the term computer system 1100 is broadly used to describe any computing device that can store and independently run one or more programs.

Each computer system 1100 may include a communication interface 1114 coupled to the bus 1106. The communication interface 1114 provides two-way communication between computer systems 1100. The communication interface 1114 of a respective computer system 1100 transmits and receives electrical, electromagnetic or optical signals, that include data streams representing various types of signal information, e.g., instructions, messages and data. A communication link 1115 links one computer system 1100 with another computer system 1100. For example, the communication link 1115 may be a LAN, in which case the communication interface 1114 may be a LAN card, or the communication link 1115 may be a PSTN, in which case the communication interface 1114 may be an integrated services digital network (ISDN) card or a modem.

A computer system 1100 may transmit and receive messages, data, and instructions, including program, i.e., application, code, through its respective communication link 1115 and communication interface 1114. Received program code may be executed by the respective processor(s) 1107 as it is received, and/or stored in the storage device 1110, or other associated non-volatile media, for later execution.

In an embodiment, the computer system 1100 operates in conjunction with a data storage system 1131, e.g., a data storage system 1131 that contains a database 1132 that is readily accessible by the computer system 1100. The computer system 1100 communicates with the data storage system 1131 through a data interface 1133. A data interface 1133, which is coupled to the bus 1106, transmits and receives electrical, electromagnetic or optical signals, that include data streams representing various types of signal information, e.g., instructions, messages and data. In embodiments of the invention, the functions of the data interface 1133 may be performed by the communication interface 1114.

Computer system 1100 includes a bus 1106 or other communication mechanism for communicating instructions, messages and data, collectively, information, and one or more processors 1107 coupled with the bus 1106 for processing information. Computer system 1100 also includes a main memory 1108, such as a random access memory (RAM) or other dynamic storage device, coupled to the bus 1106 for storing dynamic data and instructions to be executed by the processor(s) 1107. The main memory 1108 also may be used for storing temporary data, i.e., variables, or other intermediate information during execution of instructions by the processor(s) 1107.

The computer system 1100 may further include a read only memory (ROM) 1109 or other static storage device coupled to the bus 1106 for storing static data and instructions for the processor(s) 1107. A storage device 1110, such as a magnetic disk or optical disk, may also be provided and coupled to the bus 1106 for storing data and instructions for the processor(s) 1107.

A computer system 1100 may be coupled via the bus 1106 to a display device 1111, such as, but not limited to, a cathode ray tube (CRT), for displaying information to a user. An input device 1112, e.g., alphanumeric and other keys, is coupled to the bus 1106 for communicating information and command selections to the processor(s) 1107.

According to one embodiment of the invention, an individual computer system 1100 performs specific operations by their respective processor(s) 1107 executing one or more sequences of one or more instructions contained in the main memory 1108. Such instructions may be read into the main memory 1108 from another computer-usable medium, such as the ROM 1109 or the storage device 1110. Execution of the sequences of instructions contained in the main memory 1108 causes the processor(s) 1107 to perform the processes described herein. In alternative embodiments, hard-wired circuitry may be used in place of or in combination with software instructions to implement the invention. Thus, embodiments of the invention are not limited to any specific combination of hardware circuitry and/or software.

The term "computer-usable medium," as used herein, refers to any medium that provides information or is usable by the processor(s) 1107. Such a medium may take many forms, including, but not limited to, non-volatile, volatile and transmission media. Non-volatile media, i.e., media that can retain information in the absence of power, includes the ROM 1109, CD ROM, magnetic tape, and magnetic discs. Volatile media, i.e., media that can not retain information in the absence of power, includes the main memory 1108. Transmission media includes coaxial cables, copper wire and fiber optics, including the wires that comprise the bus 1106. Transmission media can also take the form of carrier waves; i.e., electromagnetic waves that can be modulated, as in frequency, amplitude or phase, to transmit information signals. Additionally, transmission media can take the form of acoustic or light waves, such as those generated during radio wave and infrared data communications.

In the foregoing specification, the invention has been described with reference to specific embodiments thereof. It will, however, be evident that various modifications and changes may be made thereto without departing from the broader spirit and scope of the invention. For example, the reader is to understand that the specific ordering and combination of process actions shown in the process flow diagrams described herein is merely illustrative, and the invention can be performed using different or additional process actions, or a different combination or ordering of process actions. The specification and drawings are, accordingly, to be regarded in an illustrative rather than restrictive sense.

What is claimed is:

1. A method for fulfilling a user request for a web page comprising one or more portlets, comprising:
    at a portal web server, transmitting one or more first requests for content to one or more web providers, each of the one or more first requests being for content used to render at least one member of the one or more portlets;
    at each web provider, wherein when said web provider is not responsible for retrieving and supplying one or more requested contents, transmitting one or more second requests for content to one or more content retrievers, each of the one or more second requests being for a subset of content from one member of the one or more first requests corresponding to a particular subject;
    at each content retriever, transmitting one or more third requests for content to one or more content providers;
    checking, upon receiving the one or more first requests for content one or more central repositories to determine whether the one or more web pages exist in the one or more central repositories;
    retrieving the one or more web pages to assemble one or more requested web page in response to the one or more first requests for content by using information about appearance and operation of the one or more requested web page and any responses obtained from the one or more content providers; and
    assembling the web page at the portal web server using information about the appearance and operation of the one or more first, second, or third requests for content, one or more web pages stored at the one or more central repositories, and any responses to the one or more third requests for content.

2. The method of claim 1, wherein at least one of the responses to the one or more third requests for content are customized for the user using a content provider user identifier.

3. The method of claim 1, wherein the step of assembling the web page further comprises incorporated pre-generated content for at least one member of the one or more portlets.

4. The method of claim 1, further comprising:
    obtaining data from one or more content providers;
    rendering content to be displayed in the one or more portlets according to a pre-determined scheme into one or more web pages; and
    storing the one or more web pages in the one or more central repositories.

5. The method of claim 4, further comprising:
    associating one or more time stamps with the content to be displayed in one or more portlets; and
    determining whether the one or more time stamps have expired.

6. The method of claim 4, in which the content comprises one or more customizations for the user.

7. The method of claim 4, in which the step of rendering content is performed prior to receiving the request for content from the user.

8. The method of claim 4, in which the step of rendering content is performed at one or more pre-configured time intervals.

9. The method of claim 4, in which the one or more web pages to be displayed in a portlet are same for different users.

10. The method of claim 4, in which the one or more web pages to be displayed in the one or more portlets are based in part upon the one or more first requests for content.

11. The method of claim 4, in which the step of rendering the content only renders content for the one or more portlets visited within a specified time.

12. The method of claim 4, in which the step of obtaining data from the one or more content providers is performed at one or more pre-configured time intervals.

13. The method of claim 4, further comprising performing automatic error handling based upon one or more criteria.

14. A computer-readable medium carrying one or more sequences of instructions for fulfilling a user request for a web page comprising one or more portlets, wherein execution of the one or more sequences of instructions by one or more processors causes the one or more processors to perform the steps of:
    at a portal web server, transmitting one or more first requests for content to one or more web providers, each of the one or more first requests being for content used to render at least one member of the one or more portlets by using the information about the appearance and operation of a requested web page;
    at each web provider, transmitting one or more second requests for content to one or more content retrievers, each of the one or more second requests for content being for a subset of content from one member of the one or more first requests for content corresponding to a particular subject;
    at each content retriever, transmitting one or more third requests for content to one or more content providers;
    checking, upon receiving the one or more first requests for content, one or more central repositories to determine whether the one or more web pages exist in the one or more central repositories;
    retrieving the one or more web pages to assemble one or more requested web page in response to the one or more first requests for content by using information about appearance and operation of the one or more requested web page and any responses obtained from the one or more content providers; and assembling the web page at the portal web server using information about the appearance and operation of the one or more first, second, or third requests for content, one or more web pages stored at the one or more central repositories, and any responses to the one or more third requests for content.

15. The computer-readable medium of claim 14, wherein at least one of the responses to the one or more third requests for content is customized for the user using a content provider user identifier.

16. The computer-readable medium of claim 14, wherein the step of assembling the web page further comprises incorporated pre-generated content for at least one member of the one or more portlets.

17. The computer-readable medium of claim 14, in which the steps performed by the one or more processors further comprises:

obtaining data from one or more content providers;

rendering content to be displayed in the one or more portlets according to a pre-determined scheme into one or more web pages; and storing the one or more web pages in the one or more central repositories.

18. The computer-readable medium of claim 17, in which the steps performed by the one or more processors further comprises:

associating one or more time stamps with the content to be displayed in one or more portlets; and determining whether the one or more time stamps have expired.

19. The computer-readable medium of claim 17, in which the step of rendering content is performed prior to receiving the one or more first requests for content.

20. The computer-readable medium of claim 17, in which the step of rendering content is performed at one or more pre-configured time intervals.

21. The computer-readable medium of claim 17, in which the step of obtaining data from a content provider is performed at one or more pre-configured time intervals.

22. A system for fulfilling a user request for a web page comprising one or more portlets, comprising:

at a portal web server, means for transmitting one or more first requests for content to one or more web providers, each of the one or more first request being for content used to render at least one member of the one or more portlets by using the information about the appearance and operation of a requested web page;

at a web provider, means for transmitting one or more second requests for content to one or more content retrievers, each of the one or more second requests for content being for a subset of content from one member of the one or more first requests for content corresponding to a particular subject;

at a content retriever, means for transmitting one or more third requests for content to one or more content providers;

means for checking, upon receiving the one or more first requests for content, one or more central repositories to determine whether the one or more web pages exist in the one or more central repositories;

means for retrieving the one or more web pages to assemble one or more requested web page in response to the one or more first requests for content by using information about appearance and operation of the one or more requested web page and any responses obtained from the one or more content providers; and means for assembling the web page at the portal web server using information about the appearance and operation of the one or more first, second, or third requests for content, one or more web pages at the one or more central repositories, and any responses to the one or more third requests for content.

23. The system of claim 22, wherein at least one of the responses to the one or more third requests for content is customized for the user using a content provider user identifier.

24. The system of claim 22, wherein the logic for assembling the web page further comprises logic for incorporated pre-generated content for at least one member of the one or more portlets.

25. The system of claim 22, further comprising:

means for obtaining data from one or more content providers;

means for rendering content to be displayed in the one or more portlets according to a pre-determined scheme into one or more web pages; and means for storing the one or more web pages in the one or more central repositories.

26. The system of claim 25, further comprising:

means for associating one or more time stamps with the content to be displayed in one or more portlets; and means for determining whether the one or more time stamps have expired.

* * * * *

UNITED STATES PATENT AND TRADEMARK OFFICE
CERTIFICATE OF CORRECTION

PATENT NO. : 7,277,924 B1 Page 1 of 1
APPLICATION NO. : 10/141485
DATED : October 2, 2007
INVENTOR(S) : Wichmann et al.

It is certified that error appears in the above-identified patent and that said Letters Patent is hereby corrected as shown below:

On The Title Page Item (75) in "Inventors", in column 1, line 3, delete "Chieng" and insert -- Qiang --, therefor.

On The Title Page Item (75) on page 2, under "Other Publications", in column 2, line 45, delete "Switzlerand" and insert -- Switzerland --, therefor.

On sheet 2 of 5, in Figure 2 (Reference Numeral 250), line 3, before "REQUESTED" delete "THE".

In column 5, line 63, before "filed" insert -- attorney docket number 268/292, --.

In column 13, line 53, in Claim 1, delete "content" and insert -- content, --, therefor.

In column 13, line 63, in Claim 1, after "operation" insert -- at least one --.

Signed and Sealed this

Twenty-seventh Day of May, 2008

JON W. DUDAS
*Director of the United States Patent and Trademark Office*